(12) United States Patent
Zweig et al.

(10) Patent No.: US 9,460,708 B2
(45) Date of Patent: Oct. 4, 2016

(54) AUTOMATED DATA CLEANUP BY SUBSTITUTION OF WORDS OF THE SAME PRONUNCIATION AND DIFFERENT SPELLING IN SPEECH RECOGNITION

(75) Inventors: Geoffrey Zweig, Sammamish, WA (US); Yun-Cheng Ju, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 909 days.

(21) Appl. No.: 12/561,521

(22) Filed: Sep. 17, 2009

(65) Prior Publication Data

US 2010/0076752 A1    Mar. 25, 2010

Related U.S. Application Data

(60) Provisional application No. 61/098,715, filed on Sep. 19, 2008.

(51) Int. Cl.
*G06F 17/20* (2006.01)
*G06F 17/27* (2006.01)
*G10L 15/06* (2013.01)
*G10L 15/187* (2013.01)

(52) U.S. Cl.
CPC ........... *G10L 15/063* (2013.01); *G10L 15/187* (2013.01); *G06F 17/2735* (2013.01)

(58) Field of Classification Search
CPC . G06F 17/2735; G06F 17/274; G06F 9/4448
USPC ........................................................ 704/1, 9
See application file for complete search history.

(56) References Cited

U.S. PATENT DOCUMENTS

| 4,914,704 A | 4/1990 | Cole |
| 5,384,892 A | 1/1995 | Strong |
| 5,970,449 A | 10/1999 | Alleva |
| 6,134,528 A * | 10/2000 | Miller et al. .................. 704/258 |
| 6,252,589 B1 | 6/2001 | Rettig et al. |

(Continued)

FOREIGN PATENT DOCUMENTS

WO    2008/089469 A1    7/2008

OTHER PUBLICATIONS

Ju, Y.C. et al.; "A Language-Modeling Approach to Inverse Text Normalization and Data Cleanup for Multimodal Voice Search Applications"; 9th Annual Conference of the International Speech Communication Association; Sep. 22-26, 2008; Brisbane, Australia; pp. 2179-2182.

(Continued)

*Primary Examiner* — Farzad Kazeminezhad
(74) *Attorney, Agent, or Firm* — Alin Corie; Sandy Swain; Micky Minhas

(57) ABSTRACT

The described implementations relate to automated data cleanup. One system includes a language model generated from language model seed text and a dictionary of possible data substitutions. This system also includes a transducer configured to cleanse a corpus utilizing the language model and the dictionary. The transducer can process speech recognition data in some cases by substituting a second word for a first word which shares pronunciation with the first word but is spelled differently. In some cases, this can be accomplished by establishing corresponding probabilities of the first word and second word based on a third word that appears in sequence with the first word.

20 Claims, 5 Drawing Sheets

(56) References Cited

U.S. PATENT DOCUMENTS

| | | | |
|---|---|---|---|
| 6,269,335 | B1 | 7/2001 | Ittycheriah et al. |
| 6,272,455 | B1 | 8/2001 | Hoshen et al. |
| 6,694,296 | B1 | 2/2004 | Alleva et al. |
| 7,155,427 | B1* | 12/2006 | Prothia et al. ............... 707/694 |
| 7,162,423 | B2 | 1/2007 | Thrasher |
| 7,251,600 | B2 | 7/2007 | Ju |
| 7,590,608 | B2* | 9/2009 | Li et al. ........................ 706/45 |
| 7,684,988 | B2 | 3/2010 | Barquilla |
| 8,364,487 | B2 | 1/2013 | Ju |
| 2002/0091512 | A1* | 7/2002 | Karttunen et al. ............ 704/202 |
| 2002/0116196 | A1 | 8/2002 | Tran |
| 2003/0009335 | A1* | 1/2003 | Schalkwyk .......... G10L 15/187 704/257 |
| 2004/0220809 | A1 | 11/2004 | Wang |
| 2005/0005266 | A1 | 1/2005 | Datig |
| 2005/0043949 | A1 | 2/2005 | Roth et al. |
| 2005/0203750 | A1 | 9/2005 | Miyamoto |
| 2006/0069545 | A1 | 3/2006 | Wu |
| 2006/0116862 | A1* | 6/2006 | Carrier et al. .................... 704/1 |
| 2007/0099636 | A1 | 5/2007 | Roth |
| 2007/0208569 | A1 | 9/2007 | Subramanian et al. |
| 2007/0244890 | A1 | 10/2007 | Dunning |
| 2007/0250317 | A1 | 10/2007 | Davis et al. |
| 2007/0260448 | A1 | 11/2007 | Lorenzen |
| 2008/0147381 | A1 | 6/2008 | Yu |
| 2009/0070099 | A1 | 3/2009 | Anisimovich et al. |
| 2009/0124272 | A1 | 5/2009 | White |

OTHER PUBLICATIONS

Schwarm, S. et al.; "Text Normalization with Varied Data Sources for Conversational Speech Language Modeling"; Proc. ICASSP; vol. I; 2002; pp. 789-792.

Zhu, C. et al.; "A Unified Tagging Approach to Text Normalization"; Proceedings of the 45th Annual Meeting of the Association for Computational Linguistics; Jun. 2007; Prague, Czech Republic; pp. 688-695.

Jonson, R.; "Statistical Language Modeling for a Speech-Enabled MP3 Application"; Proceedings of the 11th Conference of the European Association of Computational Linguistics; 2006; pp. 57-65.

"Microsoft Speech API 5.3"; SR Engine Vendor Porting Guide; 2008.

Chung, G. et al.; "A Dynamic Vocabulary Spoken Dialogue Interface"; Proc. ICSLP; 2004.

Ollason, D. et al.; "MS Connect: A Fully Featured Auto-Attendant. System Design, Implementation and Performance"; Proceedings of 8th International Conference on Spoken Language Processing; Oct. 4-8, 2004; Jeju Island, Korea; pp. 2845-2848.

Levin, E. et al.; "Voice User Interface Design for Automated Directory Assistance"; 9th European Conference on Speech Communication and Technology; Sep. 4-8, 2005; Lisbon, Portugal; pp. 2509-2512.

Adda, G. et al.; "Text Normalization and Speech Recognition in French"; 5th European Conference on Speech Communication and Technology; Sep. 22-25, 1997; Rhodes, Greece; pp. 2711-2714.

Paul, D.B. et al.; "The Design for the Wall Street Journal-based CSR Corpus"; Human Language Technology Workshop on Speech and Natural Language; Feb. 23-26, 1992; Harriman, New York.

Acero, A. et al.; "Live Search for Mobile: Web Services by Voice on the Cellphone"; IEEE International Conference on Acoustics, Speech and Signal Processing; Mar. 30-Apr. 4, 2008; Las Vegas, Nevada; pp. 5256-5259.

Yu, D. et al.; "Automated Directory Assistance System—from Theory to Practice"; 8th Annual Conference of the International Speech Communication Association; Aug. 27-31, 2007; Antwerp, Belgium; pp. 2709-2712.

Ju, Y.C. et al.; "Call Analysis with Classification Using Speech and Non-Speech Features"; 9th International Conference on Spoken Language Processing; Sep. 17-21, 2006; Pittsburgh, Pennsylvania; pp. 2011-2014.

Bacchiani, M. et al.; "Deploying GOOG-411: Early Lessons in Data, Measurement, and Testing"; IEEE International Conference on Acoustics, Speech and Signal Processing; Mar. 30-Apr. 4, 2008; Las Vegas, Nevada; pp. 5260-5263.

Chang, S. et al.; "Modalities and Demographics in Voice Search: Learnings from Three Case Studies"; IEEE International Conference on Acoustics, Speech and Signal Processing; Mar. 30-Apr. 4, 2008; Las Vegas, Nevada; pp. 5252-5255.

Li, X. et al.; "Language Modeling for Voice Search: a Machine Translation Approach"; IEEE International Conference on Acoustics, Speech and Signal Processing; Mar. 30-Apr. 4, 2008; Las Vegas, Nevada; pp. 4913-4916.

Wikipedia search results for "Naturally Speaking", retrieved at <<https://web.archive.org/web/20071019034529/http:/en.wikipedia.org/wiki/Dragon_NaturallySpeaking>>, on Oct. 19, 2007, 6 pages.

Nuance Communications, Inc. website re "Dragon Dictation Solutions", retrieved at https://web.archive.org/web/20070819123104/http:/www.nuance.com/dragon/>> on Aug. 19, 2007, 1 page.

Non-Final Office action mailed Mar. 14, 2012 from U.S. Appl. No. 12/255,270, 9 pages.

Response filed Jul. 9, 2012 to the Non-Final Office action mailed Mar. 14, 2012 from U.S. Appl. No. 12/255,270, 12 pages.

Notice of Allowance mailed Sep. 19, 2012 from U.S. Appl. No. 12/255,270, 5 pages.

Notice of Allowance mailed Oct. 18, 2012 from U.S. Appl. No. 12/255,270, 17 pages.

"VoiceSignal", retrieved at <<http://www.voicesignal.com/solutions/index.php>>, on Aug. 6, 2008, VoiceSignal Technologies, Inc., 2007, 1 page.

"Google offers Voice Local Search service on mobile phones", retrieved at <<http://www.i4donline.net/news/news-details.asp?newsid=8628>>, on Aug. 6, 2008, Computer World, Apr. 10, 2007, 1 page.

"Yahoo! oneSearch with Voice", retrieved at <<http://in.mobile.yahoo.com/onesearch/voice>>, on Aug. 6, 2008, Yahoo! Web Services India, 2008, 2 pages.

"Google offers Voice Local Search service on mobile phones", retrieved at <<http://telecentre.eletsonline.com/2007/04/google-offers-voice-local-search-service-on-mobile-phones-2/>>, on May 2, 2016, telecentre magazine, Apr. 10, 2007, 1 page.

* cited by examiner

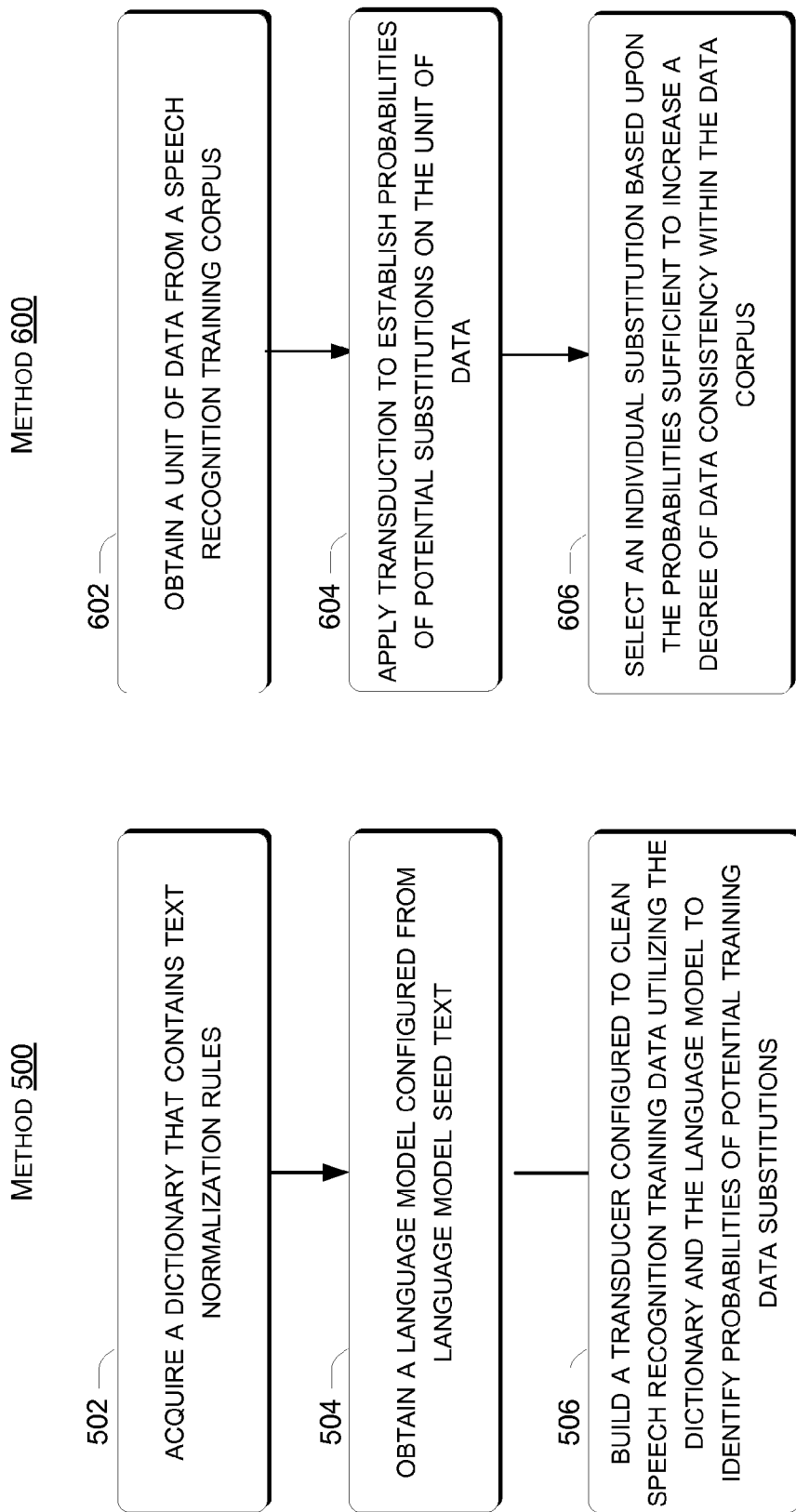

AUTOMATED DATA CLEANUP BY SUBSTITUTION OF WORDS OF THE SAME PRONUNCIATION AND DIFFERENT SPELLING IN SPEECH RECOGNITION

PRIORITY

This patent application claims priority from U.S. Provisional Application No. 61/098,715, filed on Sep. 19, 2008.

BACKGROUND

Computers employ speech recognition techniques in many scenarios to enhance the user's experience. For example, speech recognition is performed by personal computers (PCs), smart phones, and personal digital assistants (PDAs), among others, to allow the user a touch free way to control the computer and/or enter data. The growth of speech recognition has been facilitated by the use of statistical language models to increase speech recognition performance. One constraint of statistical language models is that they require a large volume of training data in order to provide acceptable speech recognition performance. Often the training data contains inaccuracies or inconsistencies that ultimately affect the speech recognition performance of statistical language models trained with the inconsistent training data. The present concepts relate to automated data cleanup that increases the consistency of training data for use in speech recognition and/or related fields.

SUMMARY

The described implementations relate to automated data cleanup. One system includes a language model generated from language model seed text and a dictionary of possible data substitutions. This system also includes a transducer configured to cleanse a corpus utilizing the language model and the dictionary.

Another implementation is manifested as a method that acquires a dictionary of text normalization rules and generates a language model from language model seed text. The method also builds a transducer configured to clean speech recognition training data by applying inverse text normalization with the language model to identify probabilities of potential training data substitutions. The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

FIGS. 5-6 are flowcharts of exemplary automatic data cleanup techniques in accordance with some implementations of the present concepts.

DETAILED DESCRIPTION

Overview

This patent application pertains to automated data cleanup and specifically to automatically cleaning data for use in training speech recognition applications, speech-to-speech applications, and text-to-speech applications, among others. As used herein, the data is "cleaned" in that errors are removed from the data and/or the data is made more consistent.

Viewed from one perspective, the present implementations can generate a cleaning module configured to achieve data cleanup. In one configuration, the cleaning module can obtain units of data, such as words or sentences. The cleaning module can compare the unit of data in its present or input form to one or more potential alternative forms. Each of the input form and the alternative forms can be assigned a relative probability of being the correct form by the cleaning module. The cleaning module can then output whichever of the input form or an individual alternative form that is assigned the highest probability. This output or cleaned form of the data is more useful as training data for speech/text related applications since better training data can allow the applications to produce better (i.e., more accurate and/or consistent) results.

Exemplary Implementations

Figure 1:
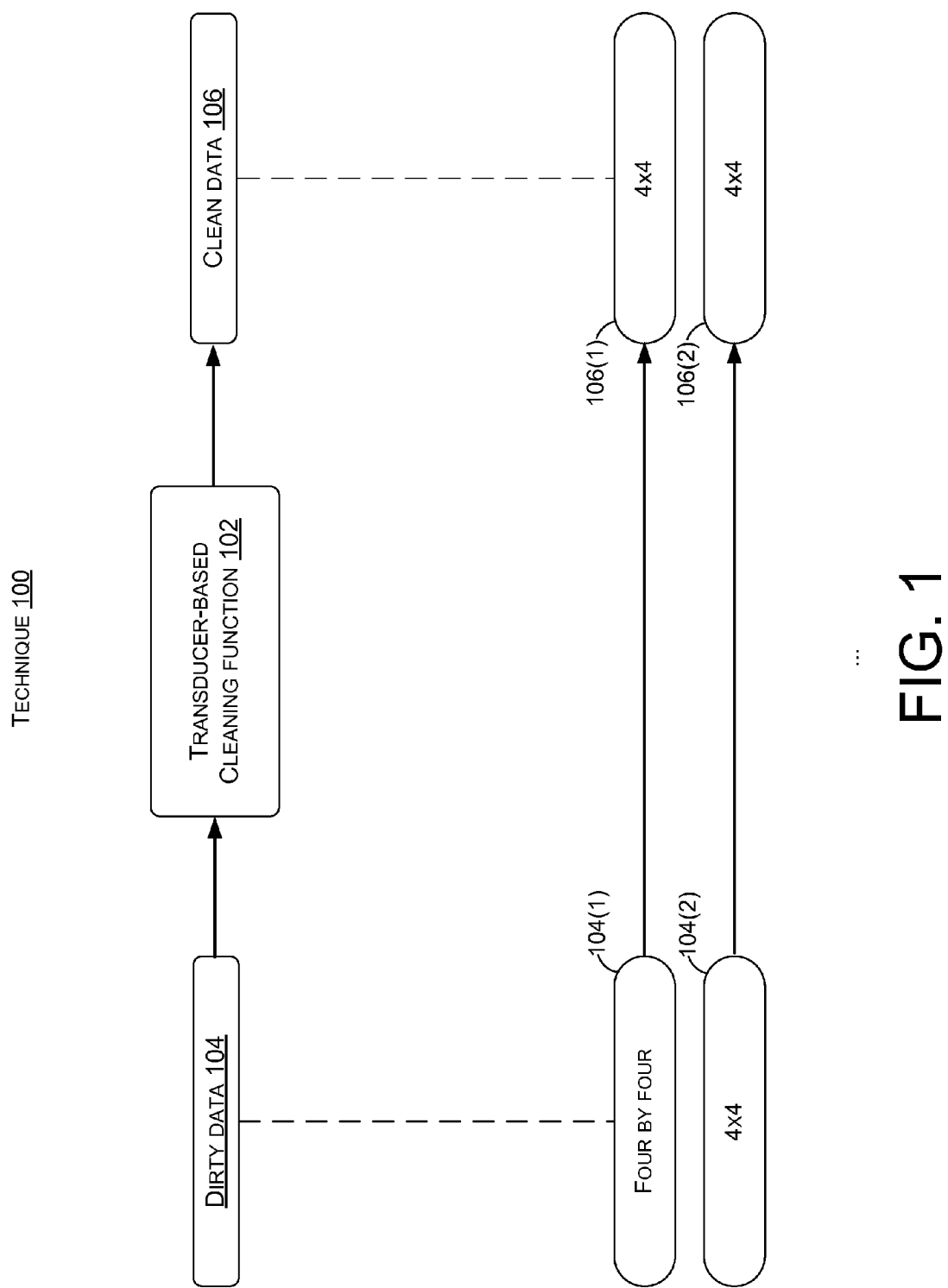
FIGS. 1-2 show exemplary techniques for implementing automatic data cleanup in accordance with some implementations of the present concepts.
Figure 2:
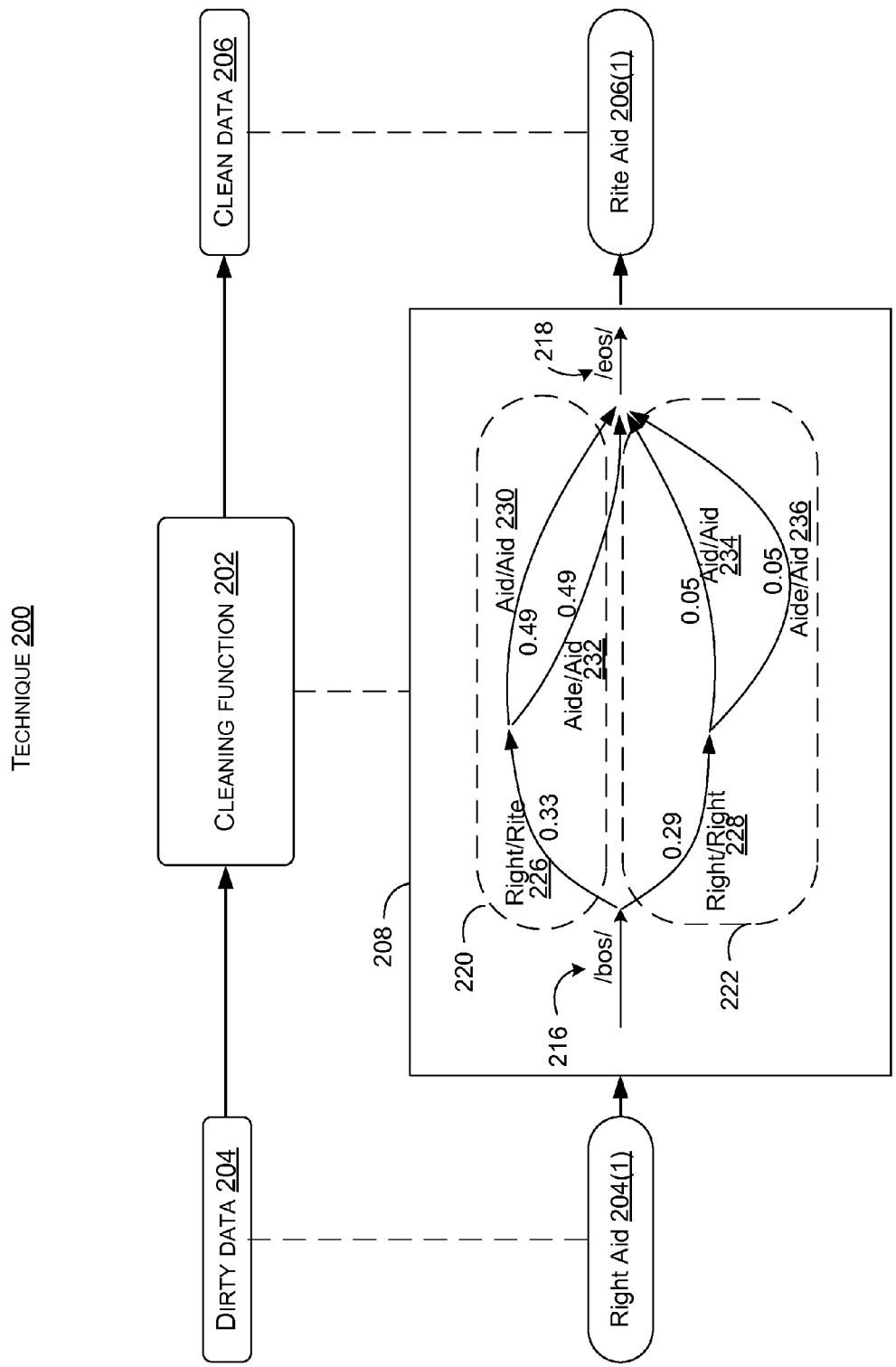

FIGS. 1-2 describe two aspects of the present concepts for providing automatic data cleanup. In these two figures components/functions are introduced generally on the upper portion of the drawing page and examples of the components/functions are illustrated on the lower portion of the drawing page.

FIG. 1 shows an exemplary automated data cleanup technique 100. In this case, a transducer-based cleaning function 102 is performed on dirty or inconsistent data 104 to produce clean or consistent data 106. Two examples from dirty data 104 that can be cleaned are designated as phrases "four by four" 104(1) and "4×4" 104(2). In this implementation, the transducer-based cleaning function can be performed on the dirty data phrases 104(1), 104(2) to output clean data phrases 106(1), 106(2), respectively. Clean data 106(1) and 106(2) is more consistent that dirty data 104(1) and 104(2) in that a given phrase is consistently represented in both instances of the clean data. Other examples of how the present implementations can clean data are described below. The increased consistency of the cleaned data can enhance the performance of any speech recognition application that is trained with the cleaned data relative to the dirty data. Examples of such a system are evidenced in FIGS. 3-4.

FIG. 1 represents a common scenario encountered with training data. For example, dirty training data 104 can include data from multiple sources that may or may not record data in the same way. In this example, assume that each of two sources received the same data, yet one source recorded dirty data phrase 104(1) "four by four" while the other source recorded dirty data phrase "4×4" 104(2). The present implementations solve this scenario and provide increased consistency in clean data 106 relative to dirty data 104.

FIG. 2 shows another exemplary automated data cleanup technique 200. As with FIG. 1, a transducer-based cleaning function 202 is performed on dirty data 204 to produce clean data 206. In this case, cleaning function 202 is achieved utilizing transduction as is illustrated generally at 208. Dirty data 204 is manifested as a phrase "Right Aid" 204(1). The cleaning function processes the dirty data phrase 204(1) to output clean data phrase 206(1) in the form of "Rite Aid".

In this example, the transduction process 208 starts by processing the beginning word of the phrase "Right Aid" at beginning of sentence (bos) 216 and ends after the last word of the sentence (eos) 218. For discussion purposes two alternative paths are designated generally at 220, 222 respectively. Paths 220, 222 are not intended to be inclusive of all potential paths and other paths are omitted for sake of brevity. The paths 220 and 222 offer two potential alternatives or substitutions for the first word of the input or dirty data 204. On path 220, at 226 a first input word could be "Right" with a corresponding output word being "Rite". A probability for this scenario is listed as 0.33. On path 222, at 228 the first input word could be "Right" and the corresponding output word could be "Right". A probability for this scenario is listed as 0.29. Viewed another way, path 220 shows the probability that the input word "Right" should actually be "Rite" in the present context. Path 222 shows the probability that the input word "Right" is the correct form for the present context (i.e., that the output should match the input).

Next, on path 220, as evidenced at 230, a probability of 0.49 is indicated that the second input word "Aid" should be output as "Aid". Alternatively at 232 the second input word could be "Aide" and the second output word could be "Aid" with a probability of 0.49. (An example of a source of these potential data substitutions is discussed below in relation to FIGS. 3-4). Similarly, on path 222, as indicated at 234, a probability of 0.05 is listed where the second input word could be "Aid" with an output of "Aid". Alternatively, at 236 a probability of 0.05 is listed for a scenario where the second word in input as "Aide" and output as "Aid".

Technique 200 indicates the relative probabilities of general paths 220 and 222 and for specific options within the paths. Transducer-based cleaning function 202 can clean the dirty data by selecting the path with the highest probability.

Exemplary Systems

Figure 3:
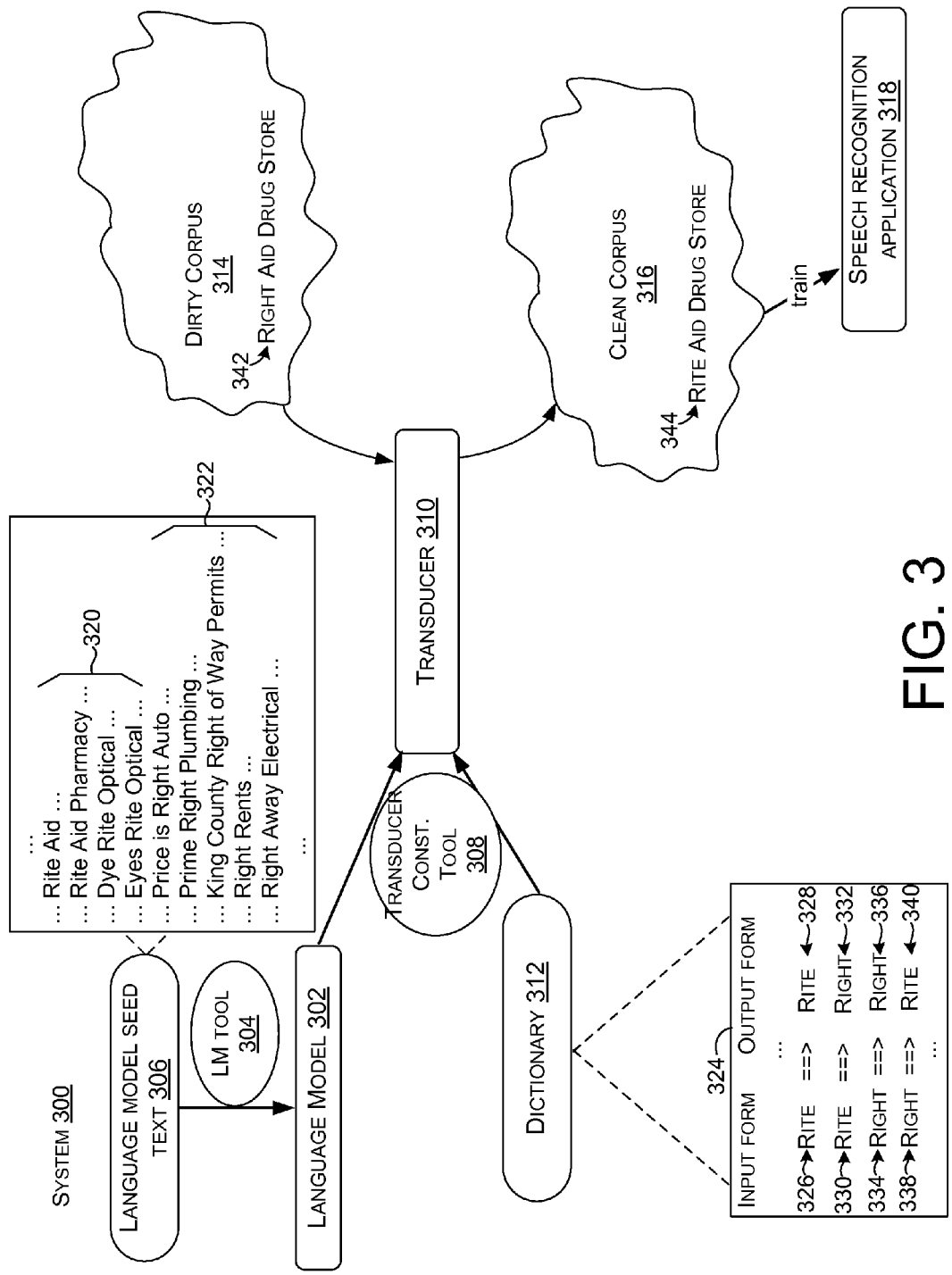
FIGS. 3-4 illustrate exemplary automatic data cleanup systems in accordance with some implementations of the present concepts.

FIG. 3 shows an example of a system 300 configured to implement techniques 100 and/or 200 described above. In system 300 a language model (LM) 302 can be created by a language model tool 304 utilizing language model seed text 306. In this example, illustrated language model seed text entries contain the words "Right" and "Rite".

A transducer construction tool 308 can generate a transducer 310 utilizing a dictionary 312 and the language model 302. Transducer 310 can receive a dirty corpus 314 of data and output a clean corpus 316. The clean corpus can be utilized in various scenarios, such as for training a speech recognition application 318.

Language model 302 can predict or map the words in a unit of data, such as a sentence by assigning probabilities to various alternative words. The language model is trained with the language model seed text 306. For instance, the language model seed text contains entries that correctly utilize the word "Rite" at 320 and entries that correctly utilize the word "right" at 322. The language model seed text can be highly accurate/clean text. The language model seed text can be obtained from trusted sources, such as phone books. The language model seed text can alternatively be obtained from any carefully checked data derived from spoken queries, web logs, etc.

A potential advantage of the configuration of system 300 is that a relatively small amount of accurate language model seed text 306 can be utilized to train the language model 302 that then can contribute to cleaning a very large amount of data in dirty corpus 314. Accordingly, from one perspective the language model seed text 306 can be thought of as "seed" data in that a relatively small amount enables the development of language model 302 that can contribute to cleaning a relatively large amount of dirty data in dirty corpus 314.

Dictionary 312 can contain a listing of potential data substitutions, such as speech-to-text substitutions, word variations (i.e., right and rite), inconsistent labeling, and/or other useful information. For instance, large sets of rules have been manually compiled in the speech-to-text (e.g., text normalization) realm. These rules can be added as entries to the dictionary. For instance, a few dictionary entries are evidenced generally at 324. For example, at 326 the dictionary indicates that in a given scenario input speech "Rite" should be output as "Rite" at 328. Similarly, at 330 the dictionary indicates that in another scenario input speech "Rite" should be output as "Right" 332, and in still another scenario input speech "Right" 334 should be output as "Right" at 336. Finally, at the dictionary indicates at 338 that in another scenario input speech "Right" 338 should be output as "Rite" 340.

Transducer 310 can utilize the dictionary entries to increase consistency whenever a dictionary term is encountered in the dirty corpus 314. For instance, the transducer can establish the probabilities for dictionary variations found in the dirty corpus 314. In one configuration, the transducer can apply inverse text normalization to the encountered data so that "Right Aid Drug Store" 342 of the dirty corpus 314 has a high degree of probability of being output in the clean corpus 316 as "Rite Aid Drug Store" 344. Such a configuration can increase the consistency of the clean corpus 316.

As mentioned above, traditional solutions in text normalization scenarios utilized sets of manually generated rules to address inconsistencies in the data. For instance, a rule might be that if "dr" is encountered in close proximity to a state name or a zip code then convert "dr" to "Drive" (as part of a mailing address e.g., "123 Meadow Drive, Seattle, Wash. 98765"). Alternatively, if "dr" is encountered directly proceeding a person's name then treat "dr" as "Doctor" (e.g., "Doctor John Smith"). This manual rule making process is very time consuming and cumbersome. Further, the rules only provide guidance when a specific rule addresses an encountered phrase from the dirty corpus 314. In contrast, by utilizing available rules as entries in dictionary 312 and utilizing the dictionary in combination with language model 302 allows the transducer 310 to establish potential alternatives for any phrase encountered in dirty corpus 314. Further, transducer 310 can specify the relative probabilities of the potential alternatives and select the alternative that has the highest probability regardless of whether anyone ever thought to create a rule that relates to the encountered phrase.

In summary, the transducer 310 can utilize the language model 302 and the dictionary 312 to increase the consistency of any speech recognition training data encountered, rather than simply those scenarios for which a rule has been manually created. Thus, the transducer can automatically process any speech recognition training corpus without relying upon specific text normalization rules to be manually created for the speech recognition training corpus.

Figure 4:
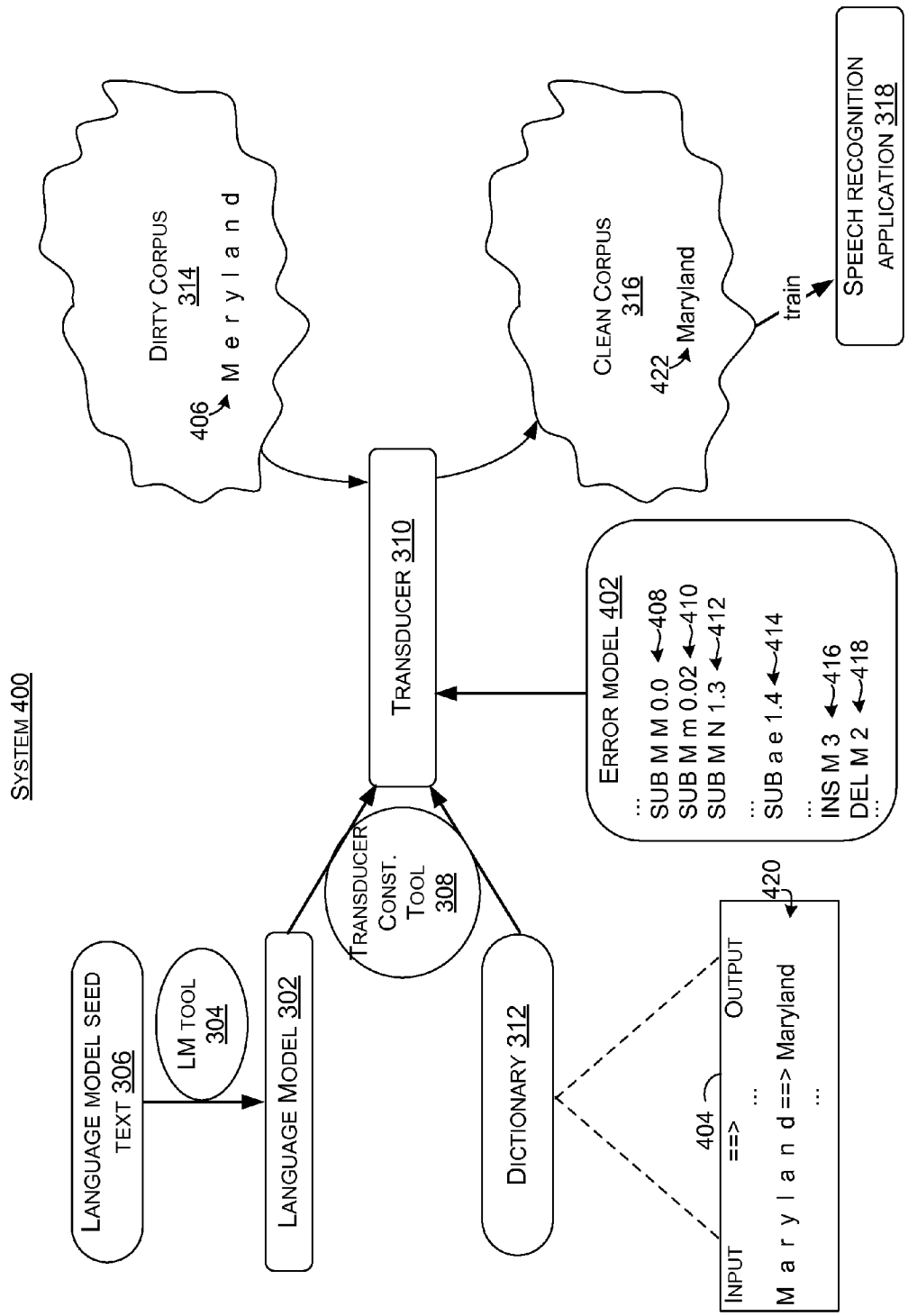

FIG. 4 shows a system 400 that offers an alternative implementation to system 300. The components of system 300 are retained with one exception and one addition. In this manifestation, system 400 contains an error model 402 that can be accessed by transducer 310. To explain the function of the error model 402, the dictionary is updated and designated as 404, other components retain their previous designation and are not reintroduced here for sake of brevity.

Error model 402 allows system 400 to address errors, such as typographical errors contained in dirty corpus 314. These errors can be at the word and/or letter/symbol level. For example, assume that dirty corpus 314 contains a typed entry that includes the letters "M e r y l a n d" at 406.

Transducer 310 can utilize error model 402 to detect the error in the spelling of "Maryland" as "Meryland". For instance, at 408 the error model states "SUB M M 0.0" which indicates that the cost of reading an "M" and matching it to an "M" is zero. A second line 410 states "SUB M m 0.02" which indicates that reading an "m" and matching to "M" has a cost of 0.02. A third line 412 states "SUB M N 1.3" which indicates that the transducer will match "Naryland" to "Maryland" at a of cost 1.3. A fourth line 414 states "SUB a e 1.4" which indicates that the transducer can read an "e" and match it to an "a" at a cost of 1.4. A fifth line 416 states "INS M 3" which indicates that the transducer can insert "M" at a cost of 3. This allows the process to match "MMaryland". A sixth line 418 states "DEL M 2" which indicates that the transducer can make deletions at a cost of 2. This process allows a match of "aryland". The M/m substitution of line 410 will allow *any* m to turn into its capitalized form "M" to output the word "Maryland".

Lines 408-418 allow transducer 310 to predict the probability that particular input symbols were involved typographical errors and should be output in a different (i.e., corrected) form. Of course, the error model would likely include many more entries or lines that those shown here for purposes of explanation. In summary, specifying the error model at the character level can provide a significant improvement in generalization. For example, the system described above in relation to FIG. 3 can address word substitutions such as correcting "Right Aid" to "Rite Aid". Addition of an error model allows the system to also correct misspellings such as "Rit Aid", "Riight Aid", "Rited Aid", etc.

Utilizing the error model 402 can allow transducer 310 to determine that the typed entry of the letters "M e r y l a n d" at 406 should be replaced with the letters "M a r y l a n d". The transducer can then utilize dictionary entry 420 to replace the letters "M a r y l a n d" with the word "Maryland" 422 which is output to the clean corpus at 316.

Systems 300 and 400 can be accomplished in stand-alone configurations where all of the components (i.e., language model 302, transducer 310, and dictionary 312) and data (i.e., language model seed text 306, dirty corpus 314 and clean corpus 316) reside on a single computing device. Other scenarios can involve distributed configurations where the components and/or data exist on different computing devices that are communicatively coupled. Various types of computers or computing devices, such as PCs, Apple brand computers, smart phones, etc. can be employed in specific implementations to achieve the data cleanup and/or other functions.

Exemplary Methods

FIG. 5 illustrates a flowchart of a method or technique 500 that is consistent with at least some implementations of the present concepts. The order in which the technique 500 is described is not intended to be construed as a limitation, and any number of the described blocks can be combined in any order to implement the technique, or an alternate technique. Furthermore, the technique can be implemented in any suitable hardware, software, firmware, or combination thereof such that a computing device can implement the technique. In one case, the technique is stored on a computer-readable storage media as a set of instructions such that execution by a computing device causes the computing device to perform the technique.

The technique acquires a dictionary that contains text normalization rules at block 502. Examples of dictionaries are described in relation to FIGS. 3-4 above. The dictionary can be assembled from available data variations, such as text normalization rules, or an existing dictionary can be acquired and utilized.

The technique obtains a language model configured from language model seed text at block 504. The language model can be generated utilizing language model seed text or a preconfigured language model can be obtained. The language model seed text can be thought of as highly accurate and/or consistent data for generating the language model.

The technique builds a transducer configured to clean speech recognition training data utilizing the dictionary and the language model to identify probabilities of potential training data substitutions at block 506. The inverse text normalization can be applied from pre-established text normalization rules, such as those of the dictionary acquired at block 502 above. The transducer can identify potential substitutions and select a substitution (or the original form) that has the highest probability. Applying inverse text normalization can serve to increase consistency within the training data in that characters, words, phrases and/or sentences are consistently presented throughout the cleaned speech recognition training data.

FIG. 6 illustrates a flowchart of a method or technique 600 that is consistent with at least some implementations of the present concepts. The order in which the technique 600 is described is not intended to be construed as a limitation, and any number of the described blocks can be combined in any order to implement the technique, or an alternate technique. Furthermore, the technique can be implemented in any suitable hardware, software, firmware, or combination thereof such that a computing device can implement the technique. In one case, the technique is stored on a computer-readable storage media as a set of instructions such that execution by a computing device causes the computing device to perform the technique.

Block 602 obtains a unit of data from a speech recognition training corpus. The unit of data can be a symbol, word, phrase, sentence or entire corpus. So, for instance, the technique can process the speech recognition training corpus letter-by-letter, word-by-word, and/or sentence-by-sentence until the entire corpus is processed.

Block 604 applies transduction to establish probabilities of potential substitutions on the unit of data. Transduction can be employed in a manner that leverages a language model, a dictionary and/or an error model. The language model can be trained with highly consistent language model seed data. Once trained, the language model can be used to process large amounts of speech recognition training corpus data. The dictionary can contain various text normalization rules and/or other entries that can indicate potential variations or substitutions for a character, word or phrase. Transduction can apply the text normalization rules in an inverse manner so that data in the speech recognition training corpus is consistently presented in the display form. The transduction can identify potential substitutions for the unit of data and the probabilities for individual potential substitutions utilizing the language model and the dictionary.

Block 606 selects an individual substitution based upon the probabilities sufficient to increase a degree of data consistency within the data corpus. In some cases, selecting the substitution (or original) that has the highest probability can increase consistency within the training corpus, clean up errors in the training corpus, and otherwise turn a dirty corpus into a clean corpus.

CONCLUSION

Although techniques, methods, devices, systems, etc., pertaining to automated data cleanup scenarios are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system, comprising:
a language model generated from language model seed text, the language model seed text comprising first entries that correctly utilize a first word and second entries that correctly utilize a second word, wherein the second word shares a pronunciation with the first word and has a different spelling than the first word;
a dictionary of available data substitutions, the available data substitutions including a substitution of the second word for the first word;
a transducer configured to process speech recognition data utilizing the language model and the dictionary, wherein, to process the speech recognition data, the transducer is further configured to:
establish probabilities including a first probability of a first alternative that replaces an occurrence of the first word in the speech recognition data with the second word, and a second probability of a second alternative that leaves the occurrence of the first word in the speech recognition data without modification, the probabilities being established based on a third word that appears in sequence with the occurrence of the first word in the speech recognition data; and
when the first probability exceeds the second probability, applying the first alternative by replacing the occurrence of the first word in the speech recognition data with the second word that shares the pronunciation with the first word and has a different spelling than the first word; and
a computing device configured to execute at least the transducer.

2. The system of claim 1, further comprising an error model that is accessible by the transducer and wherein the error model includes:
available letter substitutions including an individual available letter substitution that matches a letter substitution misspelling of a third word in the speech recognition data, wherein the letter substitution misspelling substitutes a second letter for a first letter that is present in a corrected form of the third word,
available letter deletions including an individual available letter deletion that matches a letter deletion misspelling of the third word in the speech recognition data, wherein the letter deletion misspelling is identical to the corrected form of the third word except for a single missing letter that is present in the corrected form of the third word and not the letter deletion misspelling, and
available letter additions including an individual available letter addition that matches a letter addition misspelling of the third word in the speech recognition data, wherein the letter addition misspelling is identical to the corrected form of the third word except for a single additional letter that is present in the letter addition misspelling but not the corrected form of the third word.

3. The system of claim 2, wherein:
the error model is configured to assign a first cost to the individual available letter substitution, a second cost to the individual available letter deletion, and a third cost to the individual available letter addition; and
the transducer is configured to apply spelling corrections to the speech recognition data based on the first cost, the second cost, and the third cost.

4. The system of claim 1, wherein the first word is "Right" and the second word is "Rite".

5. The system of claim 1, wherein the first word is "Aid" and the second word is "Aide".

6. The system of claim 1, wherein the transducer is configured to:
when the second probability exceeds the first probability, apply the second alternative by leaving the occurrence of the first word in the speech recognition data instead of replacing the occurrence of the first word with the second word.

7. A method, comprising:
by a computing device:
obtaining speech recognition input that includes an occurrence of a first word, wherein the first word shares a pronunciation with a second word that is spelled differently than the first word;
process the speech recognition input to identify probabilities for at least two different alternative language outputs, the probabilities including:
a first probability of a first speech recognition output obtained by replacing the occurrence of the first word in the speech recognition input with the second word, and
a second probability of a second speech recognition output obtained by leaving the occurrence of the first word in the speech recognition input; and
when the first probability exceeds the second probability, replacing the occurrence of the first word in the speech recognition input to obtain the first speech recognition output having the second word, and
wherein the probabilities are identified based on a third word that appears in sequence with the occurrence of the first word in the speech recognition input.

8. The method of claim 7, wherein the first word and the second word each consist only of letters without spaces, without punctuation, and without numerals.

9. The method of claim 8, wherein the second word includes a single additional letter that is not present in the first word and all other letters of the second word are identical to the first word.

10. The method of claim 9, wherein the single additional letter is the last letter of the second word.

11. The method of claim 7, further comprising:
identifying the first probability and the second probability based on a fourth word that appears with the occurrence of the first word in the speech recognition input.

12. The method of claim 11, further comprising:
when the second probability exceeds the first probability, leaving the occurrence of the first word in the speech recognition input to obtain the second speech recognition output.

13. The method of claim 7, wherein the speech recognition input comprises speech recognition training data.

14. The method of claim 7, wherein the second word that shares the pronunciation with the first word differs from the first word by only a single letter.

15. A computing device having a hardware computer-readable storage media with instructions stored thereon that, when executed by the computing device, cause the computing device to:
obtain speech recognition data that includes an occurrence of a first word, wherein the first word shares a pronunciation with a second word that is spelled differently than the first word;
determine a context in which the occurrence of the first word appears in the speech recognition data, the context identifying a third word that appears in sequence with the first word in the speech recognition data;
identify alternatives for processing the occurrence of the first word in the speech recognition data, the alternatives including:
a first alternative of replacing the occurrence of the first word in the speech recognition data with the second word, and
a second alternative of leaving the occurrence of the first word in the speech recognition data; and
select the first alternative or the second alternative based on the context identifying the third word that appears in sequence with the first word in the speech recognition data.

16. The computing device of claim 15, wherein the instructions cause the computing device to:
establish a first probability for the first alternative and a second probability for the second alternative based on the context identifying a third word that appears in sequence with the first word in the speech recognition data.

17. The computing device of claim 16, wherein the instructions cause the computing device to:
when the first probability is higher than the second probability, select the first alternative and replace the occurrence of the first word in the speech recognition data with the second word.

18. The computing device of claim 17, wherein the instructions cause the computing device to:
when the second probability is higher than the first probability, select the second alternative and leave the occurrence of the first word in the speech recognition data.

19. The computing device of claim 18, wherein the context on which the first probability and the second probability are based indicates that the occurrence of the first word appears before a fourth word in the speech recognition data.

20. The computing device of claim 19, embodied as a smart phone.

* * * * *